March 30, 1954  R. W. WILSON  2,673,509
IMPLEMENT HITCH FOR TRACTORS
Filed Nov. 1, 1951  2 Sheets-Sheet 1

INVENTOR.
RAYMOND W. WILSON
BY
W. R. Schaich
ATTORNEY

March 30, 1954
R. W. WILSON
2,673,509
IMPLEMENT HITCH FOR TRACTORS
Filed Nov. 1, 1951
2 Sheets-Sheet 2
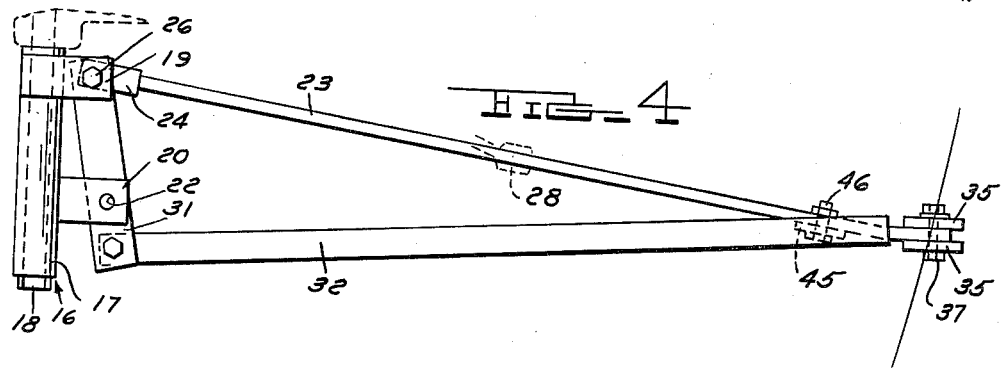
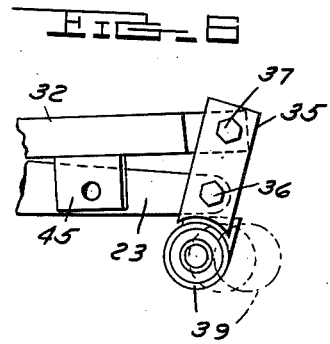
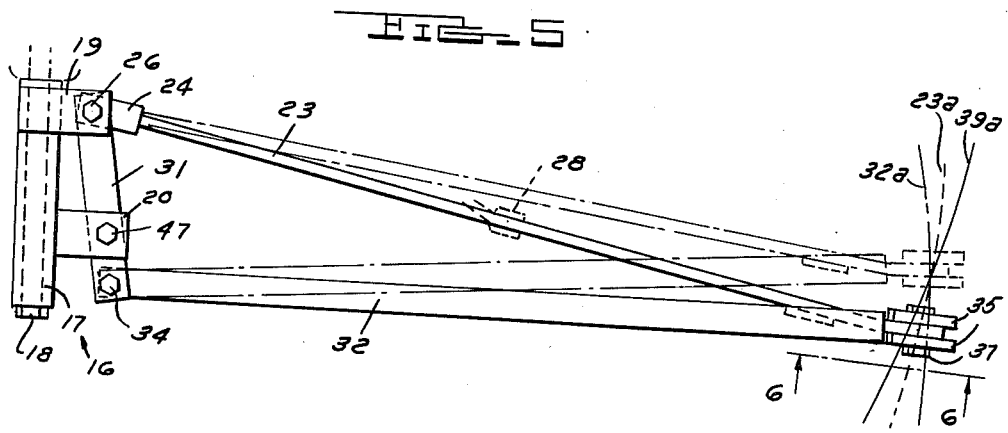
INVENTOR.
RAYMOND W. WILSON
BY
ATTORNEY Patented Mar. 30, 1954

2,673,509

UNITED STATES PATENT OFFICE 2,673,509

IMPLEMENT HITCH FOR TRACTORS

Raymond W. Wilson, Ferndale, Mich., assignor, by mesne assignments, to Ford Motor Company, Dearborn, Mich., a corporation of Delaware Application November 1, 1951, Serial No. 254,369

5 Claims. (Cl. 97—47.53)

The present invention relates to variable convergence hitch links for tractors and more particularly to variable convergence links wherein relative lateral tractor-implement movement is translated into implement-steering movement by hitch link elements pivoted to the tractor and to the implement through a steering crank arm.

In my earlier filed application, Serial Number 195,158, filed November 13, 1950, now Patent No. 2,653,823, and in the pending application of Ralph C. Frevik, Serial Number 250,251, filed October 8, 1951, now Patent No. 2,653,824, both of said applications being assigned to the assignee of the present invention, there are disclosed tractor-implement connections including pairs of links each consisting of a pair of trailing link elements connected at their forward ends to laterally spaced portions of the tractor rear axle and connected at their rear ends to an implement cross shaft through crank arms.

The present invention provides an improved hitch wherein one of the link elements of each pair may be rendered ineffective to cause movement of the crank arm, so that implement steering movement is caused solely by the other of the arms, or wherein both of the elements may be effective to cause crank arm movement with the resulting implement steering being caused by the differential pivoted movement of both elements of each pair about separated pivot axes. The resultant advantages of the present invention will be appreciated, these advantages including simplified pivot construction and lessened pivot wear, since each element need pivot about only one axis; and an expedient and simplified method of changing the effective steering points by merely selectively activating and inactivating one of the link elements; together with the more accurate steering of the linkage about one of the effective steering points by the use of only one of the elements and about another of the effective steering points by the use of both elements.

It is therefore an important object of the present invention to provide an improved variable convergence hitch link for tractors wherein certain of the link elements are selectively rendered active and inactive to vary the steering characteristics of the linkage.

Another important object is the provision of a tractor-implement connection including laterally spaced pairs of link elements and means for effecting steering movement of an implement carried by the linkage by selectively activating linkage elements of each pair.

It is a further object to provide an improved variable convergence linkage composed of linkage elements, certain of the elements being pivotable about a given axis during all periods of linkage operation and others of the elements being selectively swingable with the first elements and independently of the first elements to vary linkage steering.

Still another object of the present invention is to provide a simplified tractor-implement linkage wherein the effective steering point of an implement carried by the linkage is varied relative to the tractor by merely selectively activating and inactivating certain of the linkage elements.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 4 is a plan view of the linkage of Figure 3;

Figure 5 is a plan view illustrating operation of the linkage; and

Figure 6 is a side elevational view of the linkage in its adjusted position taken along the plane 6—6 of Figure 5.

As shown on the drawings:

Figure 1:
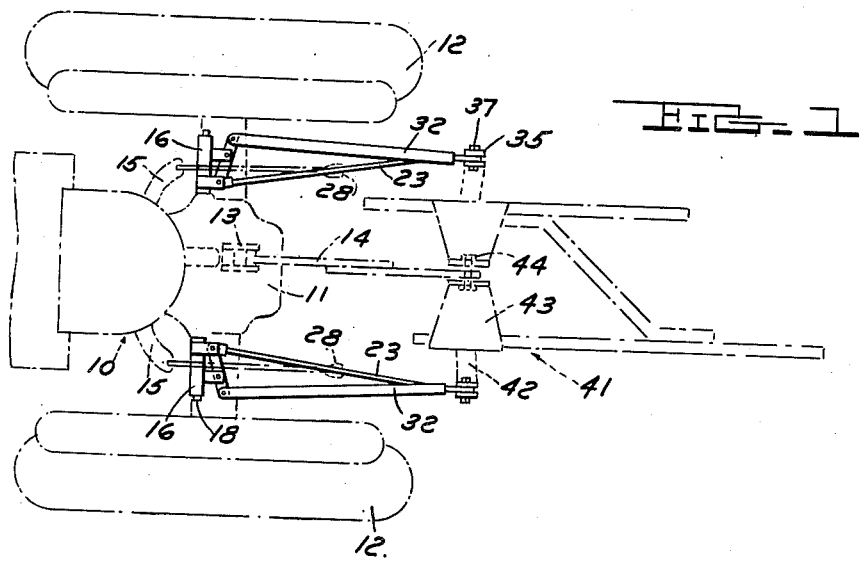
Figure 1 is a plan view of a tractor and an implement connected by means of the linkage of the present invention.
Figure 2:
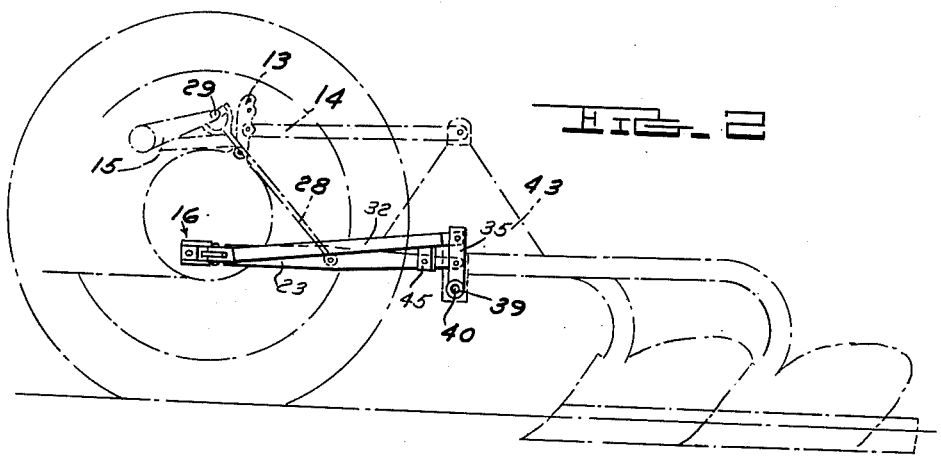
Figure 2 is a side elevational view of the tractor, implement and linkage of Figure 1, one of the tractor wheels being removed for clarity of illustration.
Figure 3:
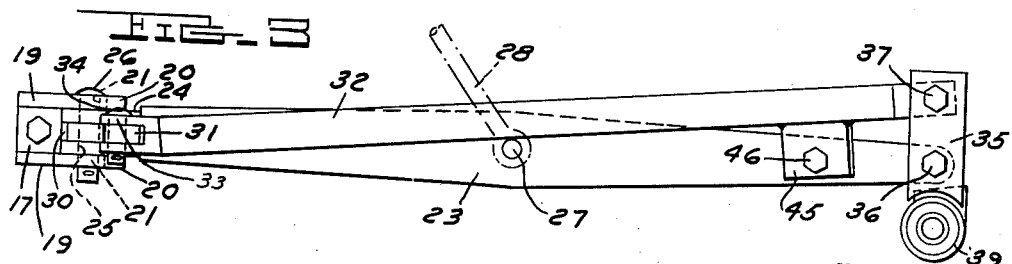
Figure 3 is a side elevational view of the linkage alone.

In Figure 1, reference numeral 10 refers generally to a tractor, such as the well-known Ford tractor, having a rear axle housing 11 enclosing an axle joining the rear wheels 12. The rear axle housing is surmounted by a control bracket 13 connected to a trailing top link 14. The rear axle housing also carries a pair of laterally spaced rock arms 15 pivoted thereto and adapted to be actuated by the conventional tractor hydraulic system.

On each side of the center of the tractor rear axle housing and near the lower portions thereof, there is pivotally mounted a mounting bracket 16 best shown in Figures 1, 2, 4 and 5. The bracket comprises an axially bored forward portion 17 receiving a pivot pin 18 therethrough, the pin being threadably received by the tractor rear axle housing and serving to dispose the bracket thereon for pivoted movement in a vertical plane only. The bracket 16 also carries inner and outer, rearwardly projecting mounting clevises 19 and 20, respectively. The clevises 19 and 20 are each provided with registering vertically aligned apertures 21 and 22, respectively, for a purpose to be hereinafter more fully described.

A primary trailing draft link 23 is provided with a forward portion 24 of reduced height but increased width which is vertically apertured as at 25 for alignment with the apertures 21 of the clevis 19. The aligned clevis and link apertures receive therethrough a pivot pin 26 which is generally vertically extending to provide a vertical pivot axis about which the link 23 is laterally movable.

The primary link element 23 is apertured intermediate its length to receive therethrough a pin 27 securing the link to lift arms 28 which in turn are pivoted at 29 (Figure 2) to the power-liftable rock arms 25 of the tractor. Thus, it will be seen that the arms 23 may be power-lifted by actuation of the rock arms 15.

The forward end 24 of the link 23 is longitudinally slotted, as at 30, to receive therebetween a laterally extending link element 31 which projects outwardly from the draft links 23 between the outer clevises 20 and therebeyond for pivoted attachment to the forward end of secondary draft links 32. The forward end of the secondary draft link 32 is bifurcated, as at 33, and vertically apertured to receive a vertically extending pivot pin 34 about which the secondary link 32 is laterally movable.

The rear ends of the trailing link elements 23 and 32 are generally vertically aligned and are interposed between generally vertically extending crank arm plates 35. The rear ends of the link arms 23 and 32, respectively, and the plates 35 are provided with registering apertures to receive pivot bolts or the like 36 and 37, respectively, therethrough. The lower ends of the plates 35 carry segmental spherical universally movable attachment bearings 39 thereon adapted for connection to horizontally disposed attachment pins 40 (Figure 2) mounted on an implement, such as the illustrated plow 41. The plow 41 is provided with a cross shaft 42 carrying the pins 40 and with an upstanding A-frame 43 pivotally connected as at 44 to the top link 14 carried by the tractor.

The secondary draft link 32 carries, adjacent its rear end, a depending plate 45 which is apertured for registry with a corresponding aperture formed in the primary draft link 23 to receive therethrough a locking bolt 46. Also, the forward link arm 31 is provided with an aperture registerable with the aperture 22 of the clevis 20, the apertures being adapted to receive therethrough a pivot bolt 47 (Figure 5).

The operation of the hereinbefore described hitch linkage will be appreciated by those skilled in the art since, with the locking bolt 46 in the position illustrated in Figure 4, the primary and secondary draft links 23 and 32, respectively, will swing as a unit about the pivot pin 26 connecting the primary link to the bracket 16. Thus, lateral relative shifting of the implement and the tractor will cause the implement to be steered about an effective pivot point located at the theoretical point of convergence of the primary links 23, as is well-known in the art. This theoretical point of convergence is preferably located in the vicinity of the tractor front axle, so that implement steering will follow tractor steering.

To obtain convergence of the linkage at a different point, it is only necessary to remove the locking bolt 46 and to insert the pivot pin 47 through the apertures 22 of the clevis 20 and the corresponding aperture of the link arm 31. It will be appreciated that the draft arms 23 and 32 are no longer co-movable after removal of the locking bolt 46. The arm 31 is rigidified in its position illustrated in Figure 5, and the draft link 32 is now movable laterally about the vertical pivot axis defined by the pin 34. Consequently, differential movement of the primary and secondary draft links is possible inasmuch as relative lateral implement-tractor movement will cause lateral swinging of the primary link 32 about the pivot pin 26 and lateral swinging movement of the secondary link 32 about the pivot pin 34. Such movement is illustrated in Figure 5 wherein the pin 36 joining the arm 23 to the crank arm 35 moves in an arc 23a having its center at the pivot pin 26, and the pivot pin 37 joining the link 32 to the crank arm 35 will move laterally along the arc 32a. Due to the vertical spacing of the attachment bearing 39 along the length of the crank arm 35, the bearing will move along the arc 39a.

In this manner, the attachment bearing 39 moves in a path which is the result of differential pivoted movement of the draft links about laterally spaced axes. Further, lateral tractor-implement relative movement has been translated into vertical movement, and this vertical movement is operative to steer the implement about an effective steering point located in the vicinity of the tractor rear axle housing. Therefore, the present invention is effective to cause steering of the implement about a point which may be varied along the length of the tractor by the selective activation and inactivation of the secondary draft link.

If it is desired to completely rigidify the linkage so that no steering of the implement occurs and no relative tractor-implement movement is possible, the locking bolt 46 is utilized to secure the linkage elements 23 and 32 to one another and the pivot pin 47 is inserted to secure the arm 31 to the bracket 16. In this manner, no pivoting action of the links occurs, and a rigid tractor-implement connection is obtained.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In an implement-tractor connection, laterally spaced brackets adapted for connection to the tractor for pivoted movement in a vertical plane, a first trailing draft link pivoted to each of said brackets, respectively, and laterally movable relative to said tractor about a forwardly located effective steering point, a crank arm pivoted to said first link and adapted for attachment to an implement, second draft links pivoted to said crank arms, respectively, in spaced relation to said first links and projecting forwardly toward the tractor, lever arms joining the forward ends of said first and second links and pivotally attached thereto, and means for selectively securing said lever arms to said brackets, whereby said lever arms when secured to said brackets cause independent pivoted movement of said first and second links, and said lever arms when free of said brackets accommodate co-movement of said first and second links.

2. In a variable convergence linkage, a pair of attachment brackets secured to a tractor for pivoting movement in one plane only, a trailing primary link element pivoted to each of said brackets for movement substantially normal to the plane in which said bracket is movable, a secondary link element in laterally spaced relation to each of said primary link elements, lever arms joining the rear ends of said primary elements to the corresponding ends of said secondary elements, said lever arms being adapted to connect said primary and secondary elements to an implement, clamping means for selectively joining said primary and secondary elements to one another for co-movement, and means for selectively operatively connecting said secondary elements to said brackets for movement independently of said primary elements.

3. A variable convergence linkage for connecting an implement to a tractor comprising laterally spaced pairs of trailing hitch link elements each of said pairs including a primary and a secondary element, said primary elements being forwardly convergent with respect to one another and said secondary elements being forwardly divergent with respect to the associated primary element, means adapted to connect the forward ends of said primary elements to the tractor for lateral pivoting movement, crank arms joining the rear ends of said pairs of elements and adapted for attachment to an implement, and means for selectively operatively connecting and disconnecting said secondary elements to the tractor to render said secondary elements effective and ineffective to modify steering of said crank arms about the effective steering point located by the convergence of said primary elements.

4. A variable convergence linkage for connecting an implement to a tractor comprising laterally swingable spaced trailing draft link elements normally forwardly convergent toward a predetermined theoretical convergence point, a crank arm pivotally connected at the rear end of each of said link elements and having a free end adapted for connection to an implement, link steering arms angularly displaced from said link elements and pivoted to said crank arms in spaced relation to the crank arms free ends and the connection of said link elements to said crank arms, means for selectively securing said steering arms to said draft link elements for co-movement so that said free ends of the crank arms are moved about said convergence point upon lateral co-movement of the link elements and the steering arms, and means for selectively effectively attaching said steering arms to the tractor for pivoted movement so that said steering arms swing laterally independently of said draft link arms, thereby steering said crank arms free ends about an effective pivot point other than said convergence point.

5. A variable convergence linkage for connecting an implement to a tractor comprising laterally swingable, spaced trailing draft link elements attachable to a tractor and normally forwardly convergent toward a theoretical convergence point, a lever pivotally connected to each link element and extending laterally therefrom, trailing link steering arms pivotally connected to said levers, respectively, in laterally spaced relation to said link elements, crank arms pivotally joining the trailing ends of said link elements and said steering arms, respectively, and each having a free end attachable to an implement, first clamping means for effectively securing each of said steering arms to the associated link element for co-movement so that said free ends of the crank arms are moved about said theoretical convergence point upon co-movement of said link elements and said steering arms, and second clamping means for rigidifying said lever with the tractor so that lateral movement of said link elements, upon release of said first clamping means, will effect relative link element-steering arm movement to move said crank arm free ends about a point other than said theoretical convergence point.

RAYMOND W. WILSON.

References Cited in the file of this patent

UNITED STATES PATENTS

| Number | Name | Date |
|---|---|---|
| Re. 22,912 | Gaertner | Sept. 9, 1947 |
| 1,759,063 | Paul | May 20, 1930 |
| 1,916,945 | Ferguson | July 4, 1933 |
| 2,322,342 | Bunn | June 22, 1943 |
| 2,398,365 | Ellis | Apr. 16, 1946 |
| 2,438,553 | Fraga | Mar. 30, 1948 |
| 2,445,145 | Love | July 13, 1948 |